United States Patent
Lee

(10) Patent No.: US 10,516,537 B2
(45) Date of Patent: Dec. 24, 2019

(54) SECURITY AUTHENTICATION SYSTEM FOR MEMBERSHIP LOGIN OF ONLINE WEBSITE AND METHOD THEREOF

(71) Applicant: EBAY KOREA CO., LTD., Seoul (KR)

(72) Inventor: Jin Yong Lee, Seongnam-si (KR)

(73) Assignee: eBay Inc., San Jose, CA (US)

( * ) Notice: Subject to any disclaimer, the term of this patent is extended or adjusted under 35 U.S.C. 154(b) by 42 days.

(21) Appl. No.: 15/550,673

(22) PCT Filed: Feb. 11, 2016

(86) PCT No.: PCT/KR2016/001382
§ 371 (c)(1),
(2) Date: Aug. 11, 2017

(87) PCT Pub. No.: WO2016/129929
PCT Pub. Date: Aug. 18, 2016

(65) Prior Publication Data
US 2018/0041339 A1    Feb. 8, 2018

(30) Foreign Application Priority Data
Feb. 11, 2015 (KR) .................. 10-2015-0021150

(51) Int. Cl.
*H04L 9/32* (2006.01)
*H04L 9/08* (2006.01)
(Continued)

(52) U.S. Cl.
CPC ............ *H04L 9/3228* (2013.01); *G06F 21/36* (2013.01); *G06F 21/42* (2013.01);
(Continued)

(58) Field of Classification Search
None
See application file for complete search history.

(56) References Cited

U.S. PATENT DOCUMENTS 8,646,060 B1 * 2/2014 Ben Ayed ........... H04L 63/0853
726/9
8,661,254 B1 * 2/2014 Sama .................... H04L 9/3215
713/168
(Continued)

FOREIGN PATENT DOCUMENTS

| CN | 107431619 A | 12/2017 |
| JP | 2010-211294 A | 9/2010 |

(Continued)

OTHER PUBLICATIONS

Mizuno et al. "Authentication Using Multiple Comunication Channels", ACM 1-59593-232-1/05/0011, Nov. 2005.*
(Continued)

*Primary Examiner* — Piotr Poltorak
(74) *Attorney, Agent, or Firm* — Schwegman Lundberg & Woessner, P.A.

(57) ABSTRACT

Disclosed is a security authentication system for a membership login of an online website capable of ensuring a safe membership login without having to directly entering a membership ID and a password for a membership login of a certain online website on a user terminal being used in association with a smartphone for a private or public purpose, and a method thereof.

20 Claims, 10 Drawing Sheets

(51) Int. Cl.
  *H04W 12/06* (2009.01)
  *G06Q 20/32* (2012.01)
  *G06Q 20/38* (2012.01)
  *H04L 29/06* (2006.01)
  *G06F 21/36* (2013.01)
  *G06F 21/42* (2013.01)
  *G06Q 20/40* (2012.01)
  *G06Q 20/42* (2012.01)

(52) U.S. Cl.
  CPC ..... *G06Q 20/3274* (2013.01); *G06Q 20/3276* (2013.01); *G06Q 20/385* (2013.01); *G06Q 20/3827* (2013.01); *G06Q 20/4014* (2013.01); *G06Q 20/425* (2013.01); *H04L 9/08* (2013.01); *H04L 9/32* (2013.01); *H04L 9/3236* (2013.01); *H04L 63/0838* (2013.01); *H04L 63/18* (2013.01); *H04W 12/06* (2013.01)

(56) References Cited

U.S. PATENT DOCUMENTS

| | | | |
|---|---|---|---|
| 8,763,097 B2 | 6/2014 | Bhatnagar et al. | |
| 9,596,223 B1* | 3/2017 | Mezei | H04L 63/0838 |
| 9,646,300 B1* | 5/2017 | Zhou | G06Q 20/3224 |
| 9,805,182 B1* | 10/2017 | Kayyidavazhiyil | G06F 21/36 |
| 9,830,594 B2* | 11/2017 | Weiner | G06Q 20/3224 |
| 9,843,571 B2* | 12/2017 | Uetabira | H04W 4/029 |
| 9,985,786 B1* | 5/2018 | Bhabbur | G09C 5/00 |
| 10,068,082 B1* | 9/2018 | Zheng | G06F 21/34 |
| 10,136,322 B2* | 11/2018 | Rougier | H04W 12/06 |
| 10,154,025 B2* | 12/2018 | Tinnakornsrisuphap | H04L 63/083 |
| 10,230,717 B2* | 3/2019 | Main | H04W 12/08 |
| 10,299,118 B1* | 5/2019 | Karachiwala | H04W 12/06 |
| 10,356,087 B1* | 7/2019 | Vetter | H04L 63/0838 |
| 2002/0133467 A1* | 9/2002 | Hobson | G06Q 20/02 705/64 |
| 2003/0191945 A1* | 10/2003 | Keech | G06Q 20/02 713/182 |
| 2006/0032917 A1* | 2/2006 | Ritter | G06K 17/00 235/385 |
| 2008/0307515 A1* | 12/2008 | Drokov | G06Q 20/32 726/7 |
| 2009/0117883 A1* | 5/2009 | Coffing | H04W 4/21 455/414.1 |
| 2011/0002456 A1* | 1/2011 | Zhang | H04M 3/42017 379/207.16 |
| 2011/0055547 A1* | 3/2011 | Lee | G06F 21/6245 713/150 |
| 2011/0219427 A1* | 9/2011 | Hito | G06F 21/00 726/3 |
| 2011/0270751 A1* | 11/2011 | Csinger | G06F 21/40 705/42 |
| 2012/0144461 A1* | 6/2012 | Rathbun | H04L 9/3213 726/5 |
| 2013/0179692 A1* | 7/2013 | Tolba | H04L 63/08 713/179 |
| 2013/0219479 A1* | 8/2013 | DeSoto | H04W 12/06 726/6 |
| 2013/0221091 A1* | 8/2013 | Koo | G06Q 10/06 235/375 |
| 2013/0232075 A1* | 9/2013 | Monaghan | G06Q 20/12 705/44 |
| 2013/0254858 A1* | 9/2013 | Giardina | G06F 21/42 726/7 |
| 2013/0262857 A1* | 10/2013 | Neuman | H04L 63/08 713/155 |
| 2013/0278622 A1* | 10/2013 | Sun | G06Q 20/22 345/589 |
| 2014/0019366 A1* | 1/2014 | Kannambadi | G06Q 20/3276 705/72 |
| 2014/0040628 A1* | 2/2014 | Fort | G06F 21/34 713/182 |
| 2014/0067678 A1* | 3/2014 | Lee | G06Q 20/02 705/44 |
| 2014/0173695 A1* | 6/2014 | Valdivia | G06F 21/36 726/4 |
| 2014/0181911 A1* | 6/2014 | Kula | H04L 63/0853 726/4 |
| 2014/0201517 A1* | 7/2014 | Corrion | H04L 63/0838 713/155 |
| 2014/0223516 A1* | 8/2014 | Vongsouvanh | H04L 63/0492 726/4 |
| 2014/0229379 A1* | 8/2014 | Jang | G06Q 20/385 705/44 |
| 2014/0230039 A1* | 8/2014 | Prakash | G06F 21/35 726/9 |
| 2014/0304780 A1* | 10/2014 | Kuang | H04L 63/06 726/4 |
| 2014/0341374 A1* | 11/2014 | Thozhuvanoor | H04L 9/0869 380/28 |
| 2014/0351589 A1* | 11/2014 | Chenna | H04L 63/0823 713/168 |
| 2015/0032578 A1* | 1/2015 | Bicer | H04L 63/08 705/26.82 |
| 2015/0047000 A1* | 2/2015 | Spencer, III | H04L 63/0876 726/7 |
| 2015/0087303 A1* | 3/2015 | Hillary | H04W 4/021 455/435.1 |
| 2015/0154813 A1* | 6/2015 | Rakow | G07B 17/00435 705/60 |
| 2015/0199684 A1* | 7/2015 | Maus | G06Q 20/3829 705/71 |
| 2015/0254451 A1* | 9/2015 | Doane | G06F 21/44 726/1 |
| 2015/0358400 A1* | 12/2015 | Bartlett, II | H04L 63/126 709/201 |
| 2015/0365235 A1* | 12/2015 | Hostyn | H04L 63/08 713/184 |
| 2016/0112437 A1* | 4/2016 | Churyumov | G06F 21/43 726/7 |
| 2016/0189147 A1* | 6/2016 | Vanczak | G06Q 20/32 705/71 |
| 2016/0191506 A1* | 6/2016 | Wang | H04L 63/0853 726/7 |
| 2016/0212144 A1* | 7/2016 | Pender | H04L 63/0838 |
| 2016/0219039 A1* | 7/2016 | Houthooft | H04L 9/3215 |
| 2016/0275491 A1* | 9/2016 | Kaladgi | H04L 63/0428 |
| 2016/0277363 A1* | 9/2016 | Kaladgi | H04L 63/0838 |
| 2016/0314462 A1* | 10/2016 | Hong | G09C 5/00 |
| 2016/0337126 A1* | 11/2016 | Gawlas | G06F 21/41 |
| 2016/0371683 A1* | 12/2016 | Maus | G06Q 20/3829 |
| 2017/0076272 A1* | 3/2017 | Zhou | G06Q 20/3221 |
| 2017/0124544 A1* | 5/2017 | Recriwal | G06Q 20/1085 |
| 2017/0161728 A1* | 6/2017 | Satyanarayan | G06Q 20/20 |
| 2017/0161729 A1* | 6/2017 | Wang | G06Q 20/3223 |
| 2017/0186008 A1* | 6/2017 | Pachouri | G06Q 20/4014 |
| 2017/0228690 A1* | 8/2017 | Kohli | G06Q 10/0832 |
| 2017/0243195 A1* | 8/2017 | Xing | G06Q 20/3278 |
| 2017/0250974 A1* | 8/2017 | Antonyraj | H04L 9/0894 |
| 2017/0280327 A1* | 9/2017 | Masuoka | H04W 12/06 |
| 2018/0034822 A1* | 2/2018 | Mistry | H04L 63/101 |
| 2018/0041339 A1* | 2/2018 | Lee | H04L 9/08 |
| 2019/0074972 A1* | 3/2019 | Shastri | G06F 21/32 |

FOREIGN PATENT DOCUMENTS

| | | |
|---|---|---|
| KR | 2002-0096258 A | 12/2002 |
| KR | 10-1205863 B1 | 12/2012 |
| KR | 10-2013-0078842 A | 7/2013 |
| KR | 10-1348249 B1 | 1/2014 |
| KR | 10-2014-0106360 A | 9/2014 |
| KR | 10-1652625 B1 | 8/2016 |
| KR | 10-1753535 B1 | 7/2017 |
| WO | 2016/129929 A1 | 8/2016 |

(56) References Cited

OTHER PUBLICATIONS

Notice of Allowance for Korean Patent Application No. 10-2015-0021150, dated May 24, 2016, 3 pages (1 page of English Translation and 2 pages of Official Copy).
Office Action received for Korean Patent Application No. 10-2015-0021150, dated Dec. 10, 2015, 16 pages (6 pages of Official Copy and 10 pages of English Pending Claims).
Response to Office Action filed on Mar. 8, 2016 for Korean Patent Application No. 10-2015-0021150, dated Dec. 10, 2015, 32 pages (1 page of English Translation, 24 pages of Official Copy and 7 pages of English Pending Claims).
Notice of Allowance received for Korean Patent Application No. 10-2016-0107599, dated Apr. 13, 2017, 3 pages (1 page of English Translation and 2 pages of official Copy).
Office Action received for Korean Patent Application No. 10-2016-0107599, dated Oct. 14, 2016, 12 pages (6 pages of Official Copy and 6 pages of English Pending Claims).
Response to Office Action filed on Dec. 12, 2016 for Korean Patent Application No. 10-2016-0107599, dated Oct. 14, 2016, 23 pages (1 page of English Translation, 16 pages of Official Copy and 6 pages of English Pending Claims).
Extended European Search report received for European Patent Application No. 16749469.9, dated Oct. 16, 2017, 7 pages.
International Preliminary Report on Patentability received for PCT Application No. PCT/KR2016/001382, dated Aug. 24, 2017, 28 pages (19 pages of English Translation and 9 pages of Official Copy).
International Search Report received for PCT Patent Application No. PCT/KR2016/001382, dated Jun. 15, 2016, 5 pages (2 pages of English Translation and 3 pages of Official Copy).
Written Opinion received for PCT Patent Application No. PCT/KR2016/001382, dated Jun. 15, 2016, 26 pages (17 pages of English Translation and 9 pages of Official Copy).
Response to European Search Report filed on Apr. 30, 2018 for European Patent Application No. 16749469.9, dated Oct. 16, 2017, 21 pages.
Communication Pursuant to Article 94(3) EPC Received for European Patent Application No. 16749469.9, dated Sep. 26, 2019, 3 pages.
Response to Communication Pursuant to Article 94(3) EPC dated Oct. 23, 2019 for European Patent Application No. 16749469.9, dated Sep. 26, 2019, 29 pages.

\* cited by examiner

SECURITY AUTHENTICATION SYSTEM FOR MEMBERSHIP LOGIN OF ONLINE WEBSITE AND METHOD THEREOF

This application is a U.S. National Stage Filing under 35 U.S.C 371 from International Application No. PCT/2016/001382, filed on 11 Feb. 2016, and published as WO 2016/129929 on 8 Aug. 2016, which claims the benefit of Korean Application Serial No. 10-2015-0021150, filed on 11 Feb. 2015, which applications and publication are incorporated by reference herein in their entirety.

BACKGROUND

1. Field of the Invention

The present invention relates to a security authentication system for a membership login of an online website and a method thereof, and more particularly, a security authentication system for a membership login of an online website capable of ensuring a safe membership login without having to directly entering a membership ID and a password for a membership login of a certain online website on a user terminal being used in association with a smartphone for a private or public purpose, and a method thereof.

2. Discussion of Related Art

In general, log-in represents an authentication process in which a user accesses a multiple user system through a network and enters authentication information that is previously registered on a terminal, such as an identification (ID) and a password, and the ID and the password are verified, so that the user is authenticated to use the system, thereby allowing the user to perform a task on the system.

Such a login process is widely used to verify a user in various systems connected through a network. Currently, the login process is achieved as a user accesses a certain online website on a terminal provided with a web browser and manually transmits login information for using the online web site, that is, a user identification and a password, to a web server through the terminal, so that a user authentication is granted.

With the recent development of computer and information communication, people of various sections obtain desired information by accessing an online website that provides various types of information on the Internet, and most online websites require a membership login to use the corresponding information.

Accordingly, users enter private information, such as a name, a social security number, an address, an e-mail address, and a phone number according to a membership sign-in procedure and a sign-in form that are required in the online website, and also set a unique identification and password for login to the online website. Therefore, when a user visits an online website where the user has signed and which is operated based on a membership system, the user logins to the website through the previously established ID and password of the user to use information provided by the online website.

However, such a method has a risk in that once a user accesses a website in an online game room, a hacker may appropriate the ID and password of the user through a cracking of a PC in the game room or by using an illegal program that combines an ID and a password.

In order to remove such a risk, various types of security authentication methods have been developed. Korean Unexamined Patent Publication No. 10-2002-0096258 (a method of authentication for the Internet) discloses a method of authenticating a user by entering iris image information of a user. To this end, a system used in the prior art requires a private terminal provided with a function to transmit iris information, and a network service provider is also required to have a database (DB) to store iris information of users in a server.

However, the conventional system and method concern a primary authentication of a user who desires access to an online website or desires payment on the Internet, which fails to deal with a situation where an unauthorized user accesses through an ID of an authorized user, and such a conventional system and method are not available to a general user who does not have a terminal for transmitting iris image information.

PRIOR ART DOCUMENT (Patent document 0001) Korean Unexamined Patent Publication No. 10-2002-0096258

SUMMARY OF THE INVENTION

The present invention is directed to a security authentication system for a membership login of an online website, capable of ensuring a safe membership login without having to directly entering an ID and a password for a membership login of a certain online website on a user terminal being used in association with a smartphone for a private or public purpose, and a method thereof.

According to a first aspect of the present invention, there is provided a security authentication system for a membership login of an online website, the security authentication system including: at least one user terminal; a smartphone configured to perform a security authentication related application service; and a security authentication server configured to a security authentication service for a membership login of a certain online website, wherein the user terminal requests a security authentication for a membership login of a certain online website from the security authentication server, by using One Time Password (OTP) information transmitted to the smartphone through the security authentication server and one time use authentication information transmitted from the security authentication server; a security authentication related application installed on the smartphone scans and analyzes the one time use authentication information transmitted from the security authentication server and displayed on a screen of the user terminal, and requests OTP information from the security authentication server by using the analyzed one time use authentication information and actual membership login authentication information of an online website; and the security authentication server generates one time use authentication information for a membership login of a certain online website requested by the user terminal, transmits the generated one time use authentication information to the user terminal, verifies one time use authentication information requested by the smartphone and actual membership login authentication information of a certain online website, generates OTP information if a corresponding user is an authenticated member, transmits the generated OTP information to the corresponding smartphone, performs a verification process on the security authentication for the membership login of the online website requested by the user terminal, and if the user is a security authenticated member, normally processes the membership login of the online website.

The security authentication server may make the generated one time use authentication information into a database (DB) and store the DB in an additional storage device.

The one time use authentication information generated through the security authentication server may include a randomly generated globally unique identifier (GUID), an IP address of a user terminal having requested a membership login, a timestamp at the time of issuing the one time use authentication information, and random data that are arranged in the order of the GUID, the IP address of the user terminal, the timestamp and the random data.

The randomly generated GUID of the one time use authentication information generated through the security authentication server may be stored as a key or an index, and the remaining information may be stored as a value or a column in an additional storage device.

The security authentication server, at the time of transmitting the generated one time use authentication information to the user terminal, may encrypt the generated one time use authentication information, and include a hash value about the generated one time use authentication information and information about a length of the encrypted one time use authentication information in the encrypted one time use authentication information to be transmitted.

The security authentication server may generate the one time use authentication information in the form of a QR code image and transmits the one time use authentication information such that the one time use authentication information is displayed on the screen of the user terminal.

The security authentication related application installed on the smartphone may extract data from the scanned one time use authentication information, decrypt the extracted data, and then verify fabrication/modification of the data through a hash-based message authentication code (HMAC).

A membership login for an online website may be requested by entering an actual membership ID and an actual password of the online website through the security authentication related application installed on the smartphone, and actual membership login authentication information of the online website may be received in the form of a token data about a result of authentication of the membership login.

The security authentication related application installed on the smartphone, at the time of requesting the OTP information from the security authentication server, may generate an OTP request query by combining the analyzed one time use authentication information with the actual membership login authentication information of the online website and making a cryptogram from the result of combination, and may transmit the OTP request query to the security authentication server.

The security authentication server may verify a validity of issuance of the one time use authentication information by decrypting the OTP request query provided by the smartphone and decrypting the one time use authentication information to inquire about details of a validated issuance of the one time use authentication information by using a GUID as a key.

The security authentication server may generate OTP information based on an IP address of a smartphone having requested the OTP information, a GUID included in the one time use authentication information, an IP address of a user terminal having requested the authentication, and a timestamp of a user terminal having requested the authentication.

The user terminal, at the time of requesting a security authentication for a membership login of a certain online website, may simultaneously transmit the one time use authentication information to a browser cookie and transmit the OTP information to a Form (HTTP Post) value.

The security authentication server may extract one time use authentication information from a user cookie requested by the user terminal, verify a validity of issuance of the one time use authentication information by decrypting the extracted one time use authentication information to inquire about details of a validated issuance of the one time use authentication information by using a GUID as a key, and verify a validity of issuance of the OTP by comparing the extracted one time use authentication information with a record of OTP issuance.

According to a second aspect of the present invention, there is provided a security authentication method for a membership login of an online website by use of a system including a user terminal, a smartphone and a security authentication server, the security authentication method including operations of: (a) by the security authentication server, generating one time use authentication information for a membership login of a certain online website requested by the user terminal, and transmitting the generated one time use authentication information to the user terminal; (b) by a security authentication related application installed on the smartphone, scanning and analyzing the one time use authentication information transmitted in operation (a), and requesting One Time Password (OTP) information from the security authentication server by using the analyzed one time use authentication information and actual membership login authentication information of an online website; (c) by the security authentication server, verifying the one time use authentication information requested in operation(b) and the actual membership login authentication information of the online website, generating OTP information if a corresponding user is an authenticated member, transmitting the generated OTP information to the corresponding smartphone; (d) by the user terminal, requesting a security authentication for the membership login of the online website from the security authentication server, by using the OTP information transmitted in operation(c) and the one time use authentication information transmitted in operation(a); and (e) by the security authentication server, performing a verification process on the security authentication for the membership login of the online website requested in operation(d), and if the user is a security authenticated member, normally processing the membership login of the online website.

In operation(a), the security authentication server may make the generated one time use authentication information into a database (DB) and store the DB in an additional storage device.

In operation(a), the generated one time use authentication information may include a randomly generated globally unique identifier (GUID), an IP address of a user terminal having requested a membership login, a timestamp at the time of issuing the one time use authentication information, and random data that are arranged in the order of the GUID, the IP address of the user terminal, the timestamp and the random data.

The randomly generated GUID of the one time use authentication information generated through the security authentication server may be stored as a key or an index, and the remaining information may be stored as a value or a column in an additional storage device.

In operation(a), the security authentication server, at the time of transmitting the generated one time use authentication information to the user terminal, may encrypt the generated one time use authentication information, and include a hash value about the generated one time use authentication information and information about a length of the encrypted one time use authentication information in the encrypted one time use authentication information to be transmitted.

In operation(a), the security authentication server may generate the one time use authentication information in the form of a QR code image and transmits the one time use authentication information such that the one time use authentication information is displayed on a screen of the user terminal.

In operation(b), the security authentication related application installed on the smartphone may extract data from the scanned one time use authentication information, decrypt the extracted data, and then verify fabrication/modification of the data through a hash-based message authentication code (HMAC).

In operation(b), a membership login for an online website may be requested by entering an actual membership ID and an actual password of the online website through the security authentication related application installed on the smartphone, and actual membership login authentication information of the online website may be received in the form of a token data about a result of authentication of the membership login.

In operation(b), the security authentication related application installed on the smartphone, at the time of requesting the OTP information from the security authentication server, may generate an OTP request query by combining the analyzed one time use authentication information with the actual membership login authentication information of the online website and making a cryptogram from the result of combination, and may transmit the OTP request query to the security authentication server.

In operation(c), the security authentication server may verify a validity of issuance of the one time use authentication information by decrypting the OTP request query provided in operation(b), and then by decrypting the one time use authentication information to inquire about details of a validated issuance of the one time use authentication information by using a GUID as a key.

In operation(c), the security authentication server may generate OTP information based on an IP address of a smartphone having requested the OTP information, a GUID included in the one time use authentication information, an IP address of a user terminal having requested the authentication, and a timestamp.

In operation(d), the user terminal, at the time of requesting a security authentication for a membership login of a certain online website, simultaneously may transmit the one time use authentication information to a browser cookie and transmit the OTP information to a Form (HTTP Post) value.

In operation(e), the security authentication server may extract one time use authentication information from a user cookie requested by the user terminal, verify a validity of issuance of the one time use authentication information by decrypting the extracted one time use authentication information to inquire about details of a validated issuance of the one time use authentication information by using a GUID as a key, and verify a validity of issuance of the OTP by comparing the extracted one time use authentication information with a record of OTP issuance.

According to a third another aspect of the present invention, there is provided a computer readable recording medium that records a program for executing the above-described security authentication method for a membership login of an online website.

The security authentication method for a membership login of an online website according to the exemplary embodiment of the present invention may be implemented as a code in a recording medium that is readable by a computer. The computer readable recording medium may include all types of recording devices storing data readable by a computer system.

For example, the computer readable recording medium may include a read-only memory (ROM), a random-access memory (RAM), a CD-ROM, a magnetic tape, a hard disk, a floppy disk, a mobile storage device, a non-volatile memory, and an optical data storage device.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
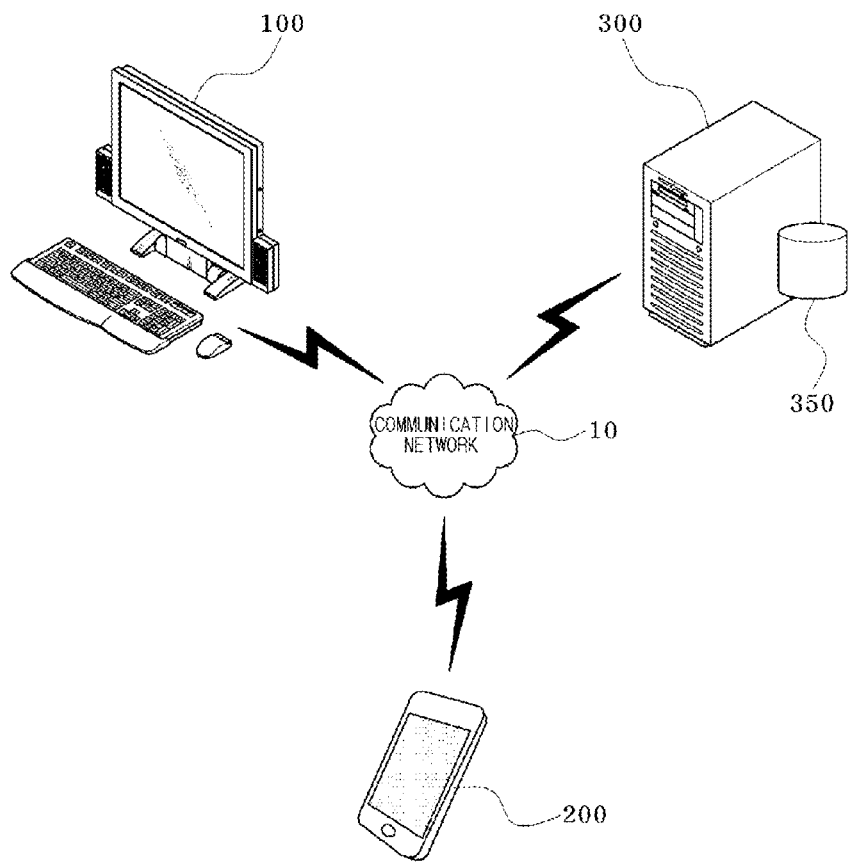
FIG. 1 is an overall block diagram illustrating a security authentication system for a membership login of an online website according to an exemplary embodiment of the present invention.

The above and other advantages, and a scheme for the advantages of the present invention will become readily apparent by reference to the following detailed description when considered in conjunction with the accompanying drawings. However, the scope of the present invention is not limited to such embodiments and the present invention may be realized in various forms. The embodiments to be described below are nothing but the ones provided to bring the disclosure of the present invention to perfection and assist those skilled in the art to completely understand the present invention. The present invention is defined only by the scope of the appended claims. In addition, the same reference numerals are used to designate the same elements throughout the drawings. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the description of the embodiments, the detailed description of related known functions or constructions will be omitted herein to avoid making the subject matter of the present invention ambiguous. In addition, terms which will be described below are defined in consideration of functions in the embodiments of the present invention, and may vary with an intention of a user and an operator or a custom. Accordingly, the definition of the terms should be determined based on overall contents of the specification.

Figure 2:
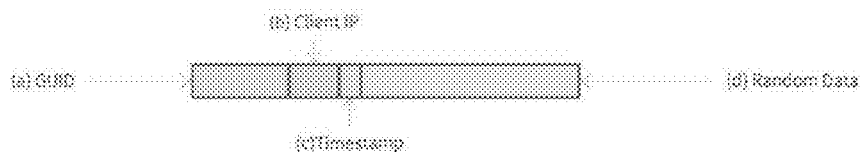
FIG. 2 is a diagram illustrating a data structure of onetime use authentication information generated through a security authentication server applied to an exemplary embodiment of the present invention.
Figure 3:
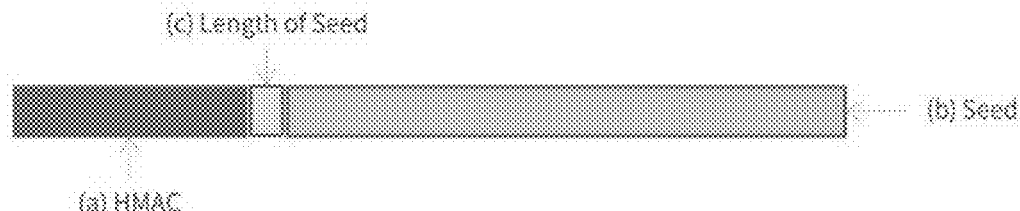
FIG. 3 is a diagram illustrating a data structure of onetime use authentication information transmitted to a user terminal through a security authentication server applied to an exemplary embodiment of the present invention.
Figure 4:
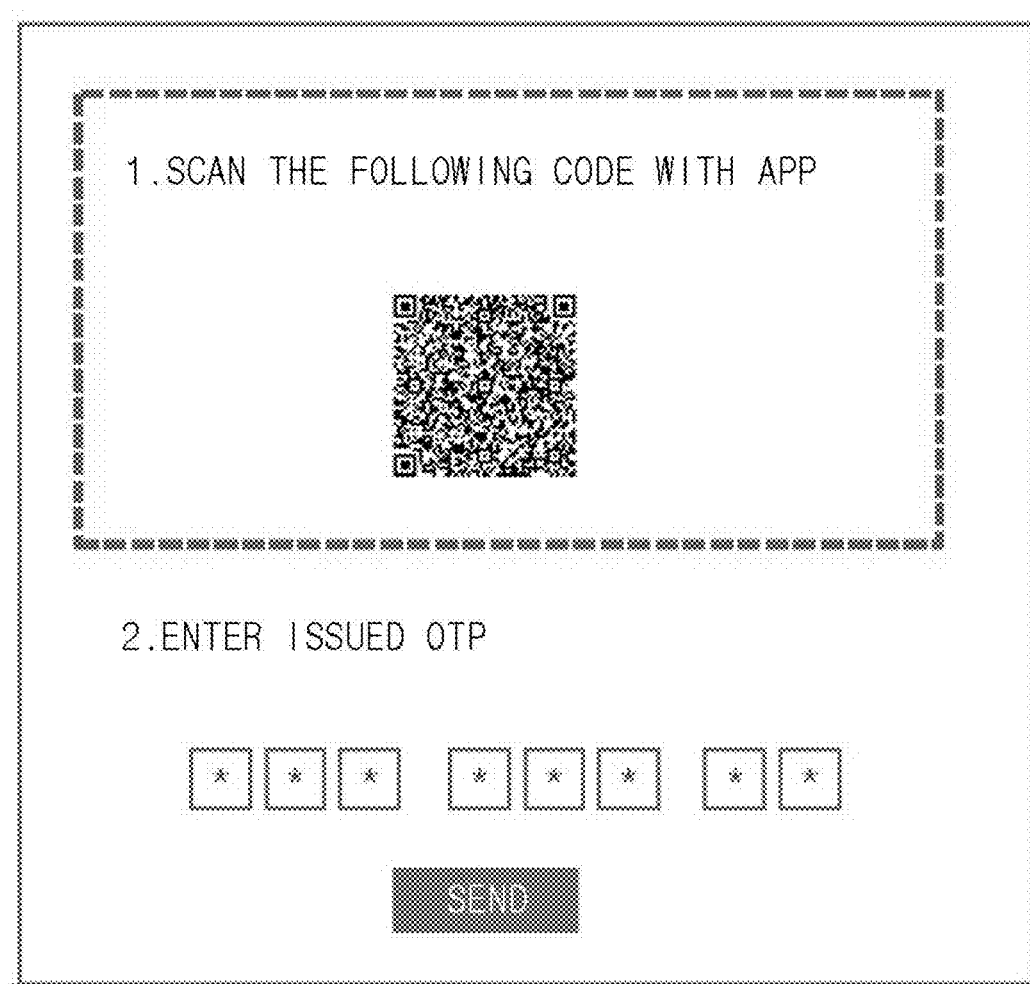
FIG. 4 is a diagram illustrating onetime use authentication information displayed on a screen of a user terminal applied to an exemplary embodiment of the present invention.
Figure 5:
FIG. 5 is a diagram illustrating OTP information displayed on a screen of a smartphone applied to an exemplary embodiment of the present invention.
Figure 6:
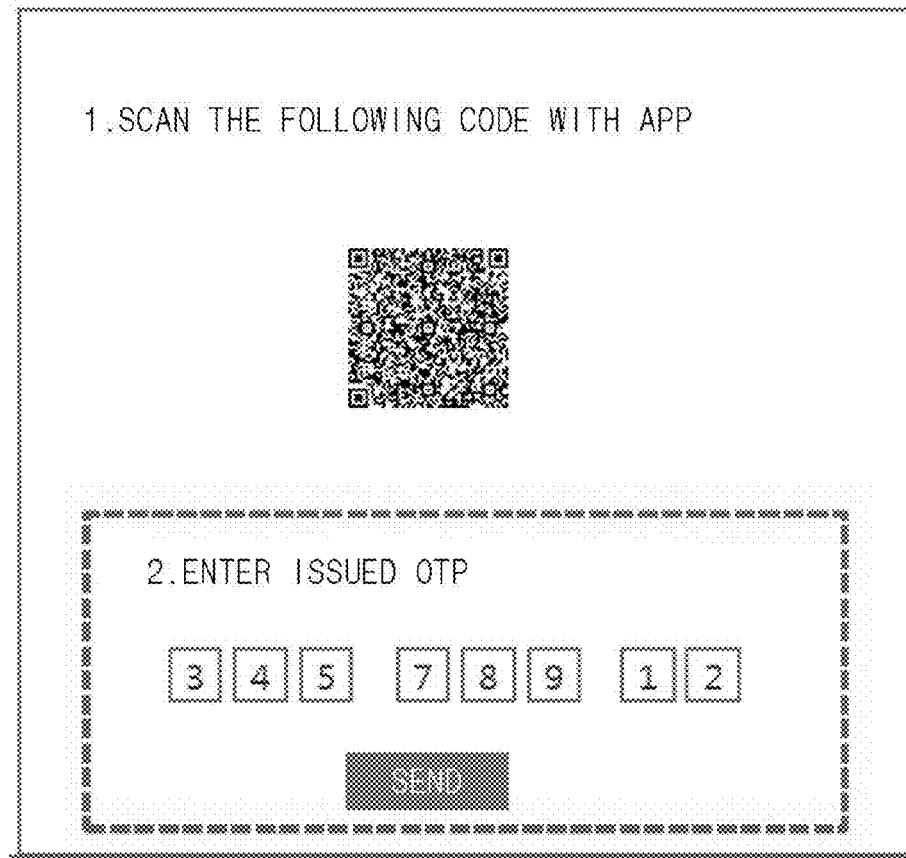
FIG. 6 is a diagram illustrating one time use authentication information and OTP information that are displayed on a user terminal for security authentication on a membership login of a certain online website applied to an exemplary embodiment of the present invention.

FIG. 1 is an overall block diagram illustrating a security authentication system for a membership login of an online website according to an exemplary embodiment of the present invention, FIG. 2 is a diagram illustrating a data structure of one time use authentication information generated through a security authentication server applied to an exemplary embodiment of the present invention, FIG. 3 is a diagram illustrating a data structure of one time use authentication information transmitted to a user terminal through a security authentication server applied to an exemplary embodiment of the present invention, FIG. 4 is a diagram illustrating one time use authentication information displayed on a screen of a user terminal applied to an exemplary embodiment of the present invention, FIG. 5 is a diagram illustrating OTP information displayed on a screen of a smartphone applied to an exemplary embodiment of the present invention, and FIG. 6 is a diagram illustrating one time use authentication information and OTP information that are displayed on a user terminal for security authentication on a membership login of a certain online website applied to an exemplary embodiment of the present invention.

Referring to FIGS. 1 to 6, a security authentication system for a membership login of an online website according to an exemplary embodiment of the present invention includes at least one user terminal 100, a smartphone 200 and a security authentication server 300.

The user terminal 100 is connected to the security authentication server 300 through a communication network 10, and serves to request generation of one time use authentication information for a membership login of a certain online website (for example, Auction, G market), receive the generated one time use authentication information from the security authentication server 300, and display the received one time user authentication information on a screen as shown in FIG. 4.

In addition, the user terminal 100 requests a security authentication for a membership login of a certain online website from the security authentication server 300 by using One Time Password (OTP) information transmitted to the smartphone 200 through the security authentication server 300 and one time use authentication information transmitted from the security authentication server 300 as shown in FIG. 6.

The user terminal 100, at the time of requesting a security authentication for a membership login of a certain online website, simultaneously transmits the one time use authentication information to a browser cookie and transmits the OTP information to a Form (HTTP Post) value.

The user terminal 100 may be provided as a desktop personal computer (PC) used for a private purpose or public purpose (for example, schools, internet cafes, and public facilities) and a notebook personal computer, but the present invention is not limited thereto. For example, the user terminal 100 may be provided using all types of wired/wireless communication devices using a security authentication service or a shopping mall related web service by accessing the security authentication server 300 through the communication network 10.

For example, the user terminal 100 may include various mobile terminals communicating through a wireless Internet or a portable Internet, and may further include all types of wired/wireless home appliance/communication devices having a user interface gaining an access to the security authentication server 300, for example, a palm PC, a mobile play-station, a digital multimedia broadcasting (DMB) phone having a communication function, a tablet PC, and an iPad.

The smartphone 200 is a phone based on an open operating system that has the freedom of downloading and deleting various application programs desired by a user, differently from a general handheld phone (referred to as a feature phone). That is, the smartphone 200 may represent a communication device including a mobile phone not only having a general function, such as voice/video call and Internet data communication but also having a mobile office function, or all types of Internet phones or tablet PCs having Internet access without a voice call function.

The smartphone 200 may be implemented to have various open operating systems mounted thereon. The open operating system may include Symbian of NOKIA, Blackberry of RIMS, IPhone of Apple, Windows Mobile of Microsoft, Android of Google, and Bada of Samsung.

As such, the smartphone 200, which uses an open operating system, may enable a user to randomly install and manage various application programs, differently from a portable phone having a closed operating system.

That is, the smartphone 200 basically includes a control unit, a memory unit, a screen output unit, a key input unit, a sound output unit, a sound input unit, a camera unit, a wireless network communication module, a near field wireless communication module and a battery for power supply.

The control unit collectively refers to functional elements to control an operation of the smartphone 200, and includes at least one processor and an execution memory. The control unit is connected to each functional element of the smartphone 200 through a Bus.

Such a control unit loads at least one program code provided on the smartphone 200 on the execution memory and operates the loaded program code through the processor, and transmits the result of operation to the at least one functional element through the Bus, thereby controlling the operation of the smartphone 200.

The memory unit collectively refers to non-volatile memories provided on the smartphone 200, and serves to store and maintain at least one program code executed through the control unit and at least one dataset used by the program code. The memory unit basically stores a system program code and a system dataset each corresponding to an operating system of the smartphone 200, a communication program code and a communication data set configured to process a wireless communication connection of the smartphone 200, and at least one application program code and application dataset. A program code and a dataset for implementing the present invention are also stored in the memory unit.

The screen output unit is composed of a screen output device (for example, a liquid crystal display (LCD)) and an output module to drive the screen output device. The screen output unit is connected to the control unit through the Bus, to output a result of operation corresponding to a screen output among various operation results of the control unit.

The key input unit is composed of a key input device provided with at least one key button (or a touch screen device interoperating with the screen output unit) and an input module to drive the key input device. The key input unit is connected to the control unit through the Bus, so that a command to instruct various operations of the control unit is input, or data required for operation of the control unit is input.

The sound output unit is composed of a speaker to output a sound signal and a sound module to drive the speaker, and is connected to the control unit through the Bus such that a result of operation corresponding to sound output among various operation results of the control unit is output through the speaker. The sound module converts sound data to be output through the speaker into a sound signal by decoding the sound data.

The sound input unit is composed of a microphone to receive a sound signal and a sound module to drive the microphone, and is configured to transmit sound data being input through the microphone to the control unit. The sound module encodes the sound signal being input through the microphone.

The camera unit is composed of an optical unit and a charge coupled device (CCD), and a camera module to drive the optical unit and the CCD. The camera unit is configured to obtain bitmap data that is input to the CCD through the optical unit. The bitmap data may include still image data and moving image data.

The wireless network communication module collectively refers to communication elements that links wireless communication, and is composed of at least one of an antenna to transmit/receive a radio frequency signal at a certain frequency band, an RF module, a baseband module, and a signal processing module. The wireless network communication module is connected to the control unit through the Bus, to transmit an operation result corresponding to a wireless communication among various operation results of the control unit in a wireless communication scheme, or to receive data in a wireless communication scheme and deliver the received data to the control unit, and at the same time, maintain access, registration, communication and handoff procedures of the wireless communication.

In addition, the wireless network communication module includes a mobile communication element to perform at least one of an access to a mobile communication network, location registration, call process, call connection, data communication and handoff according to the CDMA/WCDMA standards. Meanwhile, the wireless network communication module may further include a portable Internet communication element to perform at least one of an access to a portable Internet, a location registration, a data communication and a hand off according to the IEEE 802.16 standard depending on the intention of those skilled in the art, and it should be understood that the present invention is not limited to a wireless communication element provided by the wireless network communication module.

The near field wireless communication module is composed of a near field wireless communication module configured to connect a communication session by using a radio frequency signal as a communication medium within a predetermined distance, and may preferably include an RFID communication according to ISO180000 standards, Bluetooth communication, Wifi communication, and a public wireless communication. In addition, the near field wireless communication module may be integrated into the wireless network communication module.

The smartphone 200 constructed as such represents a terminal capable of performing a wireless communication. However, the smartphone 200 may be provided using various devices other than a smartphone as long as it may transmit and receive data through a network including the Internet. That is, the smartphone 200 may include a notebook PC and a table PC having a short message transmission function and a network access function, and a portable terminal capable of being carried and moved.

In particular, the smartphone 200 applied to the exemplary embodiment of the present invention performs a security authentication service or a shopping mall related application service by downloading a security authentication related application program or a shopping mall related application program (for example, Auction, G market App) through an App store.

In addition, the smartphone 200 may be connected to the security authentication server 300 through the communication network 10, and the communication network 10 may represent a communication network of a high speed backbone network of a large scale network capable of performing a large capacity and long distance voice/data service, and represent a next generation wireless network including WiFi, Wibro and Wimax providing the Internet or high speed multimedia services.

The communication network 10 may be provided as a mobile communication network, which is a synchronous mobile communication network or an asynchronous mobile communication network. An exemplary embodiment of the asynchronous mobile communication network may be a wideband code division multiple access (WCDMA) communication network. In this case, although not shown in the drawings, the mobile communication network may include a radio network controller (RNC). Although the detailed description thereof will be made in relation to a WCDMA network as an example, the communication network according to another example may be a 3G LTE network, a 4G network, a 5G network and other next generation communication networks, and IP-based networks. Such a communication network 10 serves to deliver signals and data between the user terminal 100 and the security authentication server 300 or signals and data between the smartphone 200 and the security authentication server 300.

In particular, a security authentication related application or a shopping related application that is installed on the smartphone 200 serves to scan and analyze one time use authentication information transmitted from the security authentication server 300 and displayed on the user terminal 100, and request OTP information from the security authentication server 300 by using the analyzed one time use authentication information and actual membership login authentication information of a certain online web site.

In this case, the security authentication related application or the shopping mall related application installed on the smartphone 200 extracts data from the scanned one time use authentication information and decrypts the extracted data, and verifies fabrication/modification of the data through a hash-based message authentication code (HMAC).

In addition, the security authentication related application or the shopping mall related application installed on the smartphone 200, at the time of requesting the OTP information from the security authentication server 300, generates an OTP request query by combining the analyzed one time use authentication information with the actual membership login authentication information of the online website and making a cryptogram from the result of combination, and transmits the OTP request query to the security authentication server 300.

Moreover, the security authentication related application or the shopping mall related application installed on the smartphone 200, after requesting a membership login of a certain online website by using an actual membership ID and an actual password of the online website which are input by a user, receives actual membership login authentication information of the online website in the form of a token data about a result of authentication of the membership login.

The security authentication server 300 performs a security authentication service for a membership login of a certain online website, and in this case, the security authentication server 300 generates one time use authentication information for a membership login of the certain online website requested by the user terminal 100 and transmits the generated one time use authentication information to the user terminal 100.

In this case, the security authentication server 300, at the time of transmitting the generated one time use authentication information to the user terminal 100, encrypts the generated one time use authentication information and includes a hash value for the generated one time use authentication information in the encrypted one time use authentication to be transmitted as shown in FIG. 3. That is, the security authentication server 300 may transmit a hash-based message authentication code (HMAC) (SHA-256 scheme, 32 bytes) and information about a length of the encrypted one time use authentication information (4 bytes) together with the one time use authentication information.

That is, the security authentication server 300 may generate the one time use authentication information in the form of a QR code image, that is, a two dimensional bar code having encrypted data embedded therein, and transmit the generated one time use authentication information to a screen of the user terminal 100 such that the one time use authentication information is displayed on the screen of the user terminal 100.

Meanwhile, the security authentication server 300 makes the generated one time use authentication information into a database (DB), and stores the DB in an additional storage device 350.

In addition, the one time use authentication information generated through the security authentication server 300 has a data structure including a randomly generated globally unique identifier (GUID) (16 bytes), an IP address of the user terminal 100 having requested a membership login (4 bytes), a timestamp at the time of issuing the one time use authentication information (4 bytes), and random data (32 bytes) that are arranged in the order of the GUID, the IP address of the user terminal, the timestamp of the user terminal and the random data.

In this case, the randomly generated GUID of the one time use authentication information is stored as a key or an index, and the remaining information is stored as a value or a column in the additional storage device 350 through the security authentication server 300.

In addition, the security authentication server 300 verifiers the one time use authentication information requested by the smartphone 200 and the actual membership login authentication information of the certain online website, and if it is verified that the corresponding user is an authenticated member, generates OTP information and transmits the generated OTP information to the smartphone 200 as shown in FIG. 5.

In this case, the security authentication server 300 verifies a validity of issuance of the one time use authentication information by decrypting the OTP request query provided by the smartphone 200, and decrypting the one time use authentication information to inquire about details of a validated issuance of the one time use authentication information by using the GUID as a key.

In addition, the security authentication server 300 may generate the OTP information based on an IP address of the smartphone 200 having requested the OTP information, a GUID included in the one time use authentication information, an IP address of the user terminal having requested the authentication, and a timestamp of the user terminal having requested the authentication.

In addition, the security authentication server 300 performs a verification process on the security authentication for the membership login of the online website requested by the user terminal 100, and if the user is a security authenticated member, normally processes the membership login of the online website.

That is, the security authentication server 300 extracts one time use authentication information from a user cookie requested by the user terminal 100; verifies a validity of issuance of the one time use authentication information by decrypting the extracted one time use authentication information to inquire about details of a validated issuance of the one time use authentication information by using the GUID as a key; and verifies a validity of issuance of the OTP by comparing the extracted one time use authentication information with a record of OTP issuance.

Meanwhile, although not shown, the security authentication server 300 may be implemented to perform all functions of the above described security authentication related service through a shopping mall server (not shown) of a certain online website while linked with the shopping mall server. Alternatively, the security authentication server 300 may be substituted with the shopping server to perform all the functions of the security authentication server 300.

In this case, the shopping mall server serves to provide an online shopping service such that products registered trough a seller terminal are purchased by use of a shopping mall related application service installed on the smartphone 200.

That is, the shopping server, which is a server for intermediating a transaction between a seller and a buyer by operating an online shopping mall service through the communication network 10, collectively manages a webpage or online shopping services required for operating a shopping mall such that various products to be sold by a seller are registered from a seller terminal through the communication network 10, and the registered various products are provided to the smartphone 200 through a web server (not shown) connected to the communication network 10, thereby enabling a buyer to purchase a desired product.

In addition, the shopping mall server may manage a webpage or online shopping mall services required for processing payment for a product determined by a buyer from a list of products, processing delivery involving procedures such as notifying information about a paid product, or processing location tracking of a product being delivered or inquiry on the result of location tracking, thereby enabling the paid product to delivered to a buyer.

The shopping mall server, which is a server to intermediate a general sale, an auction, a dutch auction and a bargaining of a product or a service between a seller and a buyer by operating an online shopping mall service through the communication network 10, has various products or services registered thereon from a seller terminal through the communication network 10, and provides the registered various products or services to the smartphone 200 of a buyer through the communication network 10, thereby enabling the buyer to purchase a desired product or service.

In addition, the web server of the shopping mall server connects the buyer smartphone 200 to the shopping mall server through the communication network 10, and provides various online shopping mall services of the shopping mall server through an application related to a certain webpage or a certain shopping mall.

Hereinafter, a security authentication method for a membership login of an online website according to an exemplary embodiment of the present invention will be described.

Figure 7:
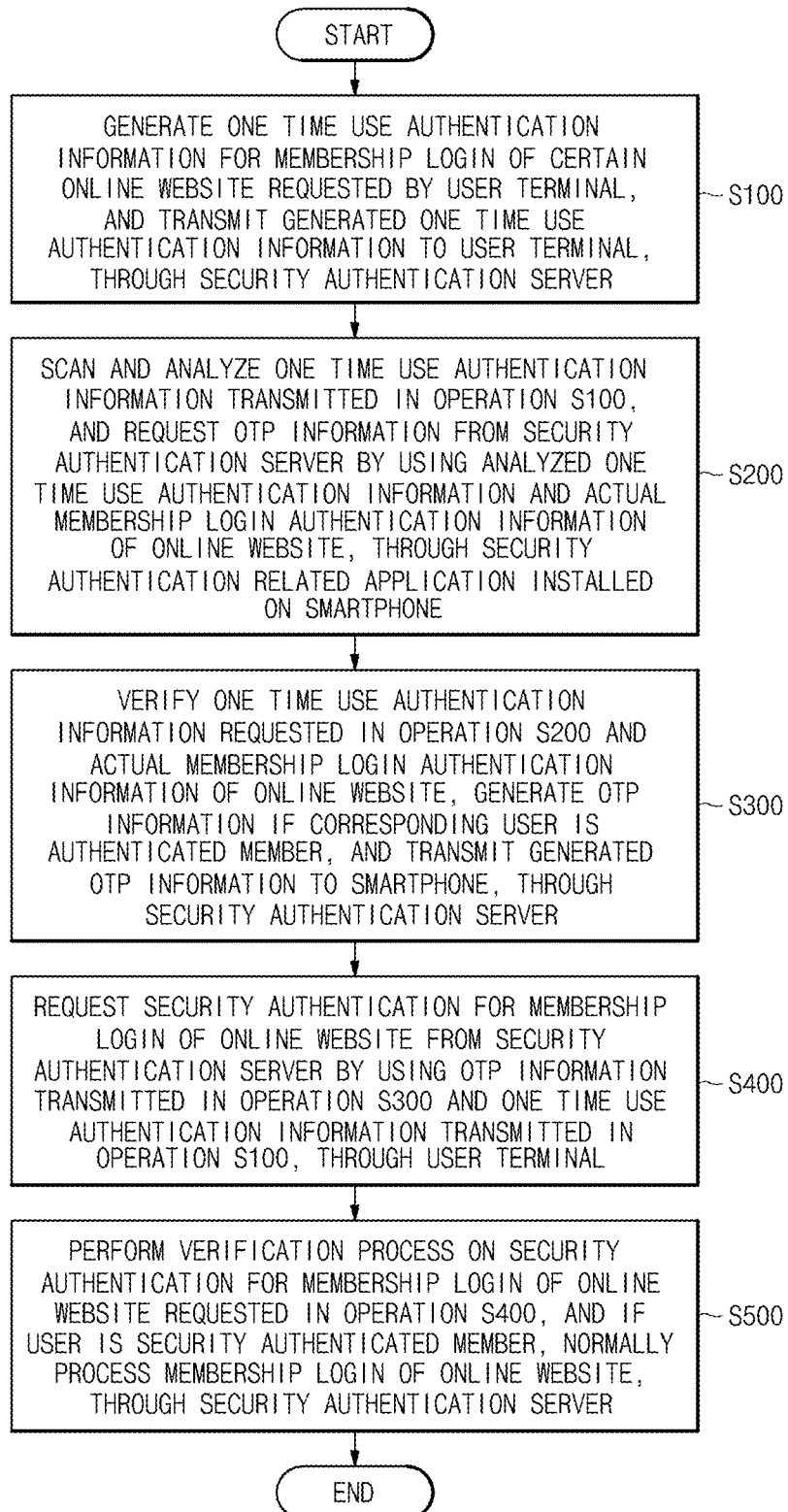
FIG. 7 is an overall flowchart showing a security authentication method for a membership login of an online website according to an exemplary embodiment of the present invention.
Figure 8:
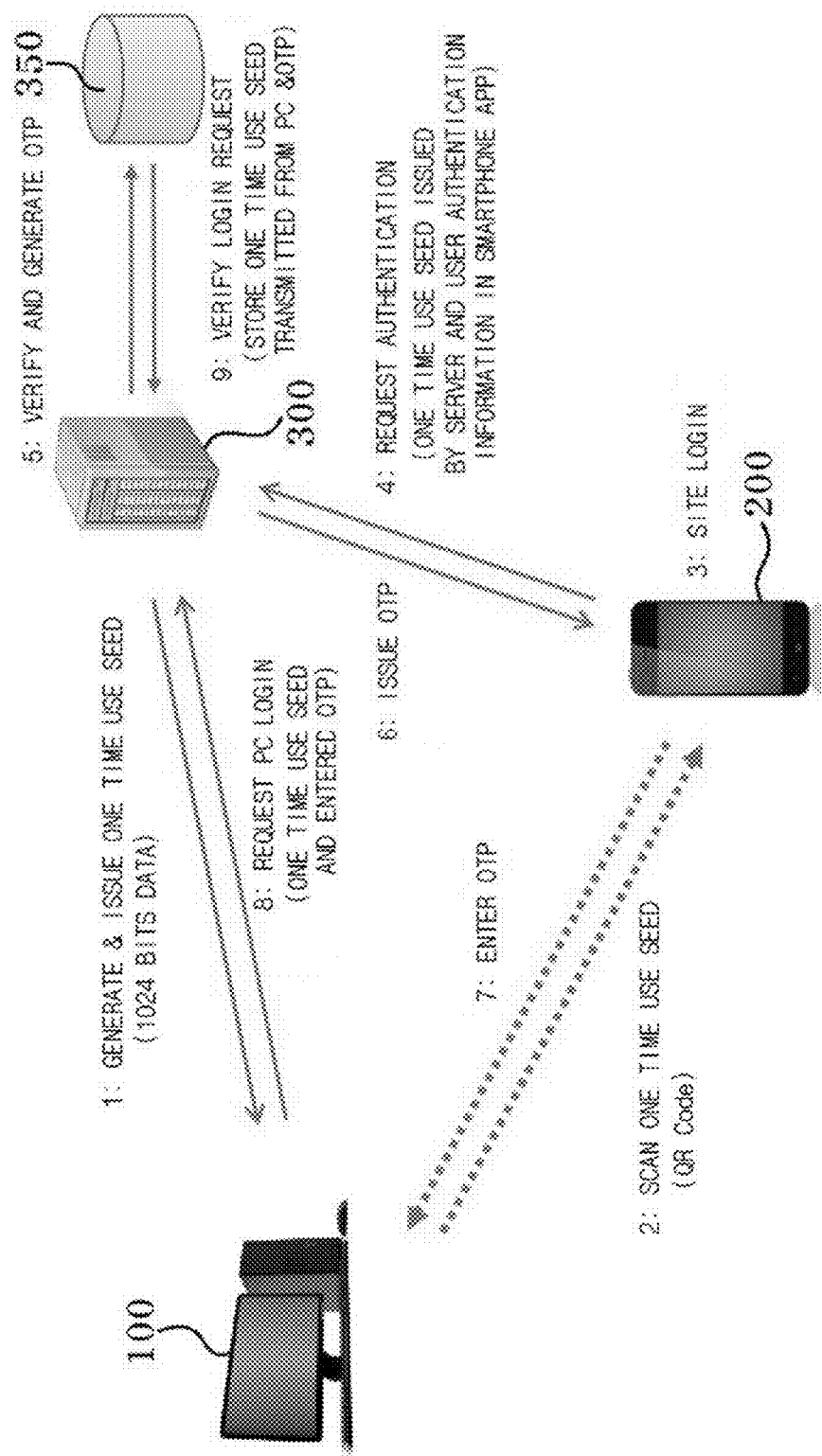
FIG. 8 is an overall flowchart showing operations among elements, which illustrates a security authentication method for a membership login of an online website according to an exemplary embodiment of the present invention.
Figure 9:
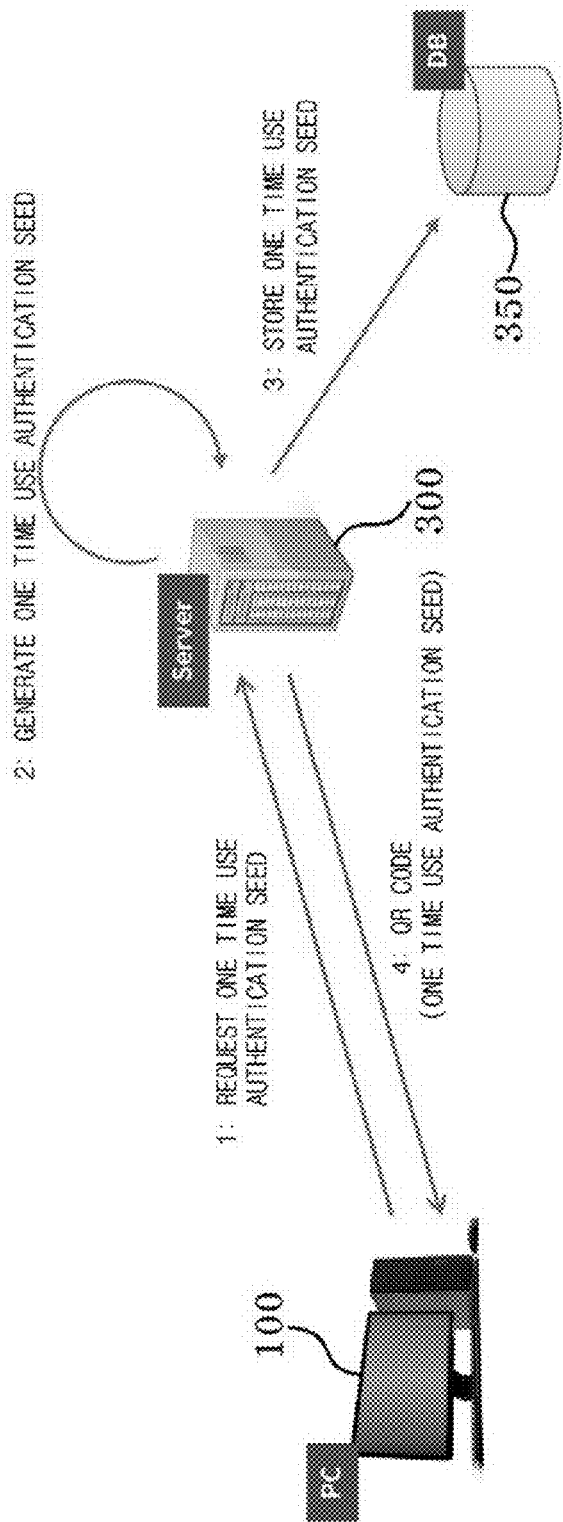
FIG. 9 is a detailed flowchart showing operations between a user terminal and a security authentication server, which illustrates generation and issuance of one time use authentication information in a security authentication method for a membership login of an online website according to an exemplary embodiment of the present invention.
Figure 10:
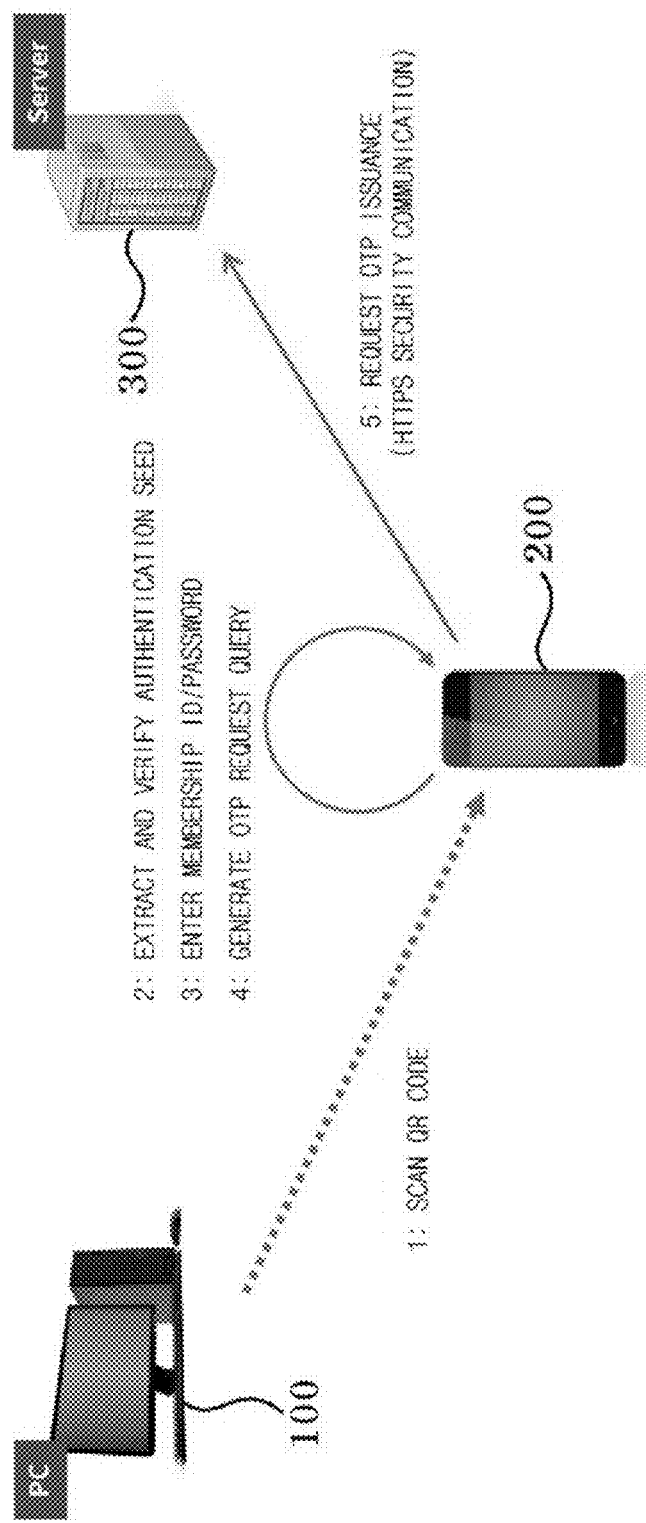
FIG. 10 is a detailed flowchart showing operations between a smartphone and a security authentication server, which illustrates a process of requesting OTP information issuance in a security authentication method for a membership login of an online website according to an exemplary embodiment of the present invention.
Figure 11:
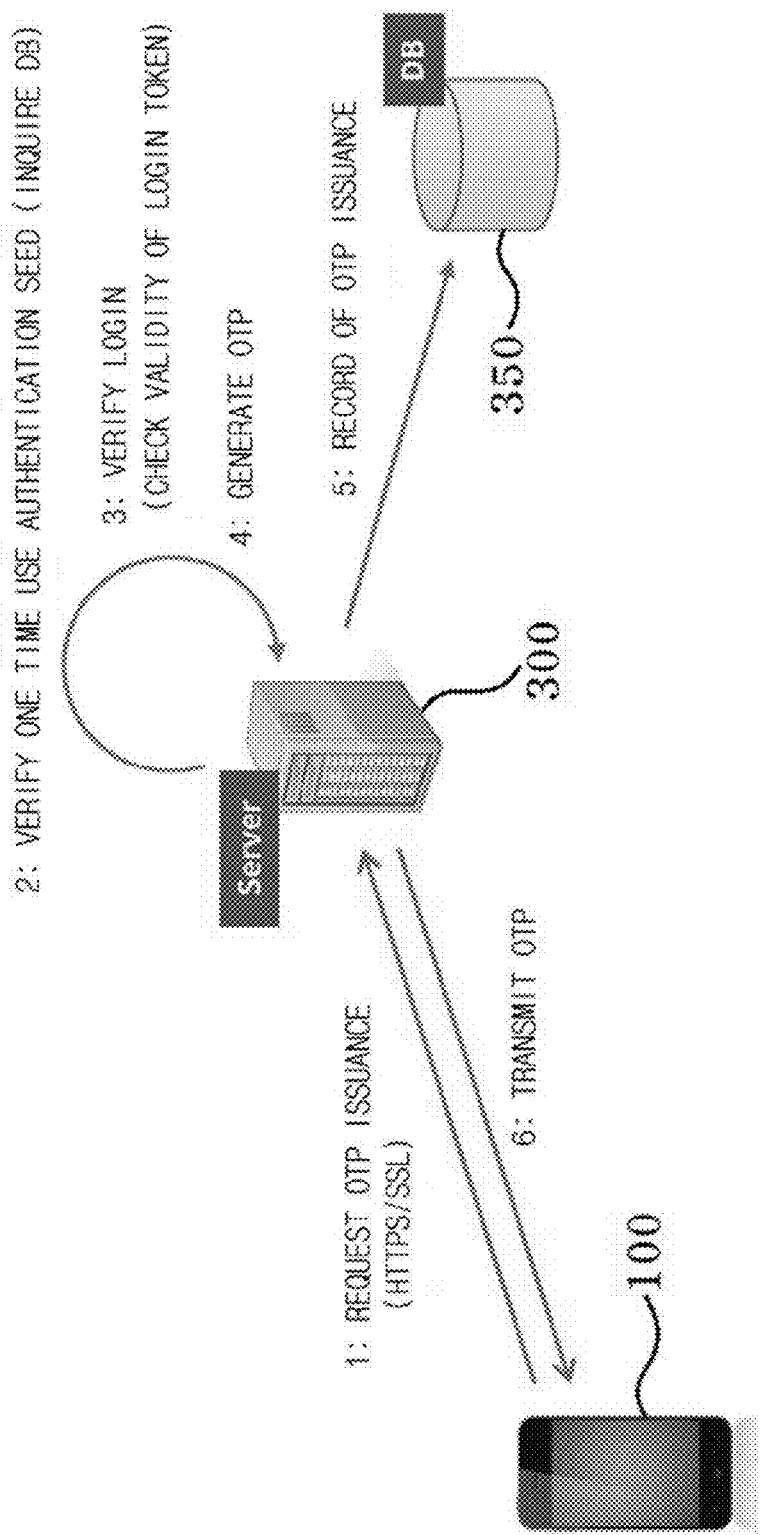
FIG. 11 is a detailed flowchart showing operations between a smartphone and a security authentication server, which illustrates a process of issuing and transmitting OTP information in a security authentication method for a membership login of an online website according to an exemplary embodiment of the present invention.
Figure 12:
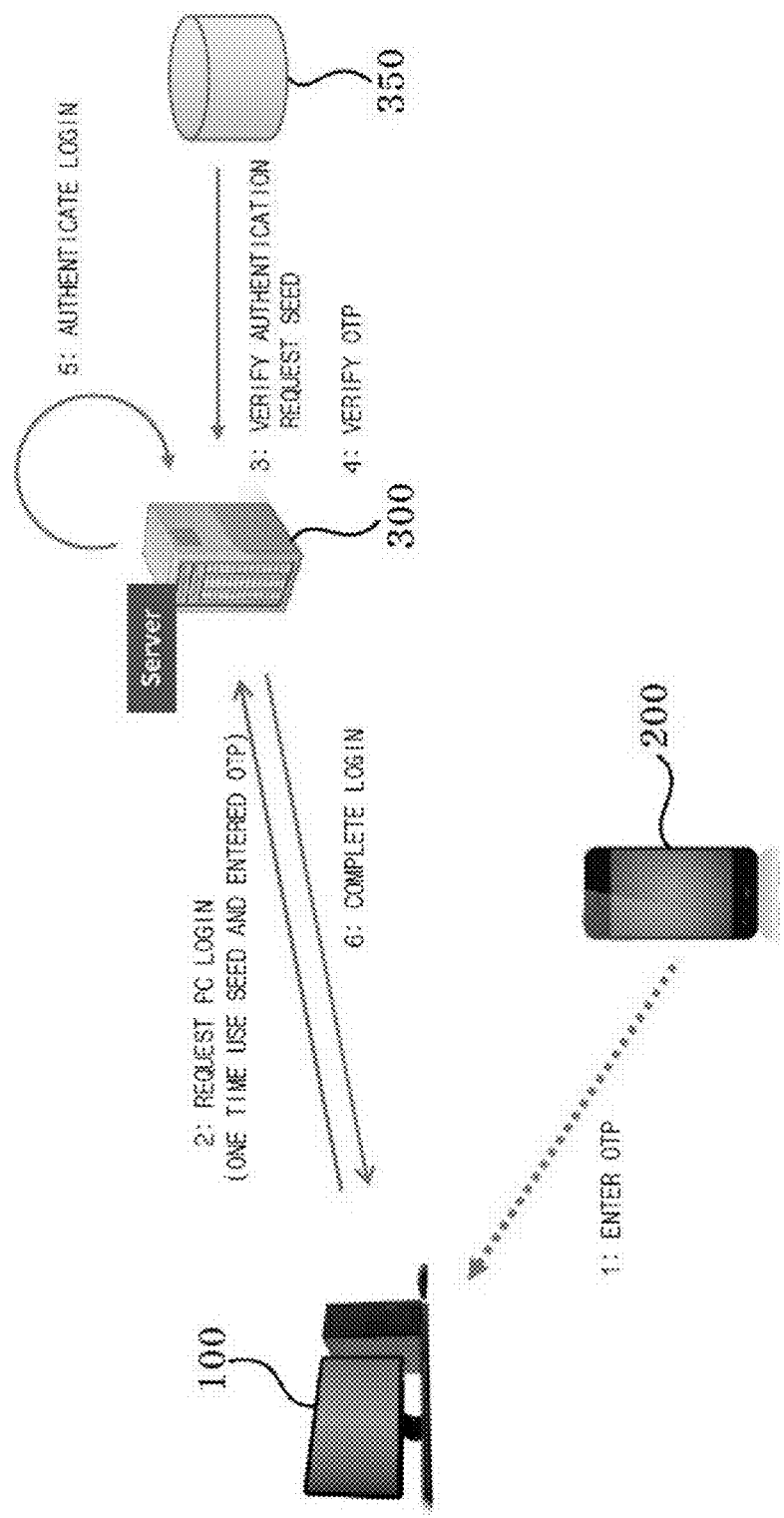
FIG. 12 a detailed flowchart showing operations between a user terminal and a security authentication server, which illustrates a security authentication process on a membership login of a certain online website in a security authentication method for a membership login of an online website according to an exemplary embodiment of the present invention.

FIG. 7 is an overall flowchart showing a security authentication method for a membership login of an online website according to an exemplary embodiment of the present invention, FIG. 8 is an overall flowchart showing operations among elements, which illustrates a security authentication method for a membership login of an online website according to an exemplary embodiment of the present invention, FIG. 9 is a detailed flowchart showing operations between a user terminal and a security authentication server, which illustrates generation and issuance of one time use authentication information in a security authentication method for a membership login of an online website according to an exemplary embodiment of the present invention, FIG. 10 is a detailed flowchart showing operations between a smartphone and a security authentication server, which illustrates a process of requesting OTP information issuance in a security authentication method for a membership login of an online website according to an exemplary embodiment of the present invention, FIG. 11 is a detailed flowchart showing operations between a smartphone and a security authentication server, which illustrates a process of issuing and transmitting OTP information in a security authentication method for a membership login of an online website according to an exemplary embodiment of the present invention, and FIG. 12 a detailed flowchart showing operations between a user terminal and a security authentication server, which illustrates a security authentication process on a membership login of a certain online website in a security authentication method for a membership login of an online website according to an exemplary embodiment of the present invention.

Referring to FIGS. 1 to 12, a security authentication method for a membership login of an online website according to an exemplary embodiment of the present invention, first, includes by the security authentication server 300, generating one time use authentication information for a membership login of a certain online website (for example, Auction and G market) requested by the user terminal 100, and transmitting the generated one time use authentication information to the user terminal 100 (S100).

Referring to FIG. 9, the user terminal 100 requests a one time use authentication seed from the security authentication server 300 in order to perform a membership login, and the security authentication server 300 generates one time use authentication information for a membership login of a certain online website.

In this case, the one time use authentication information generated as such is composed of a randomly generated globally unique identifier (GUID), an IP address of the user terminal 100 having requested a membership login, a timestamp at the time of issuing the one time use authentication information, and random data that are arranged in the order of the GUID, the IP address of the user terminal, the timestamp and the random data (see FIG. 2).

Thereafter, the security authentication server 300 makes the generated one time use authentication information into a database (DB) and stores the DB in the additional storage device 350. In this case, the security authentication server 300 stores the randomly generated GUID of the one time use authentication information as a key or an index, and stores the remaining information as a value or a column in the additional storage device 350.

Thereafter, the security authentication server 300, at the time of transmitting the generated one time use authentication information to the user terminal 100, encrypts the generated one time use authentication information, and includes a hash value about the generated one time use authentication information and information about a length of the encrypted one time use authentication information in the encrypted one time use authentication information to be transmitted (see FIG. 3).

Meanwhile, the security authentication server 300 generates the one time use authentication information in the form of a QR code image and transmits the one time use authentication information such that the one time use authentication information is displayed on the screen of the user terminal 100 (see FIG. 4).

Thereafter, a security authentication related application or a shopping mall related application that is installed on the smartphone 200 scans and analyzes the one time use authentication information transmitted in operation S100, and requests OTP information from the security authentication server 300 by using the analyzed one time use authentication information and actual membership login authentication information of an online website (S200).

Referring to FIG. 10, the security authentication related application or the shopping mall related application that is installed on the smartphone 200 scans one time use authentication information displayed on the screen of the user terminal 100, that is, scans an QR code image, extracts authentication seed data from the scanned QR code, decrypts the extracted data (AES-256), and then verifies fabrication/modification of the data through a hash-based message authentication code (HMAC).

Thereafter, as an actual membership ID and an actual password of the online website are entered in the security authentication related application or the shopping mall related application installed on the smartphone 200, the analyzed one time use authentication information is combined with the actual membership login authentication information of the online website (for example, an authentication token data), and a cryptogram is created from the result of combination (RSA encryption using a server side issuance public key) so that an OTP request query is generated and transmitted.

That is, a membership login for a certain online website is requested by transmitting an OTP issuance requesting query after connection to the security authentication server 300 through HTTP/SSL security communication, and actual membership login authentication information of the certain online website is received in the form of a token data about a result of authentication of the membership login. Meanwhile, as for an automatic login, a stored token may be loaded.

Thereafter, the security authentication server 300 verifies the one time use authentication information requested in operation S200 and the actual membership login authentication information of the online website, generates OTP information if a corresponding user is an authenticated member, and transmits the generated OTP information to the corresponding smartphone 200 (S300).

Referring to FIG. 11, the security authentication server 300, upon receiving an OTP issuance request made by the smartphone 200, verifies the one time use authentication information by referring to the DB. In detail, the security authentication server 300 verifies validity of issuance of the one time use authentication information by decrypting the OTP request query provided by the smartphone 200 (RSA-256, Private Key) and then decrypting the one time use authentication information (AES-256) to inquire about details of a validated issuance of the one time use authentication information by using the GUID as a key (for example, within 10 minutes based on the timestamp). Thereafter, the security authentication server 300 verifies a login token based on the internal criteria of the certain online website, that is, verifies actual membership login authentication information of the certain online website.

Thereafter, the security authentication server 300 generates OTP information if a corresponding user is an authenticated member, and transmits the generated OTP information to the corresponding smartphone 200. That is, the security authentication server 300 generates random numbers (eight decimal digits) corresponding to OTP information, and a basic value (seed) for generating the random numbers may be composed of an IP address of the smartphone 200 having requested the OTP information, a GUID included in the one time use authentication information, an IP address of the user terminal 100 having requested the authentication, and a timestamp of the user terminal 100.

Meanwhile, the GUID of the authentication request seed may be stored as a key, and the ID of the authenticated member may be stored as a value in the additional storage device 350.

Thereafter, the user terminal 100 requests a security authentication for the membership login of the online website from the security authentication server 300, by using the OTP information transmitted in operation S300 and the one time use authentication information transmitted in operation S100 (S400).

In this case, the user terminal 100, at the time of requesting the security authentication for the membership login of the certain online website, may simultaneously transmit the one time use authentication information to a browser cookie and transmit the OTP information to a Form (HTTP Post) value.

Finally, the security authentication server 300 performs a verification process on the security authentication for the membership login of the certain online website requested in operation S400, and if the user is a security authenticated member, normally processes the membership login of the certain online website by using a membership ID on the record of OTP issuance (S500).

Referring to FIG. 12, first, a user checks OTP information displayed on a screen of the smartphone 200 of the user, and enters the checked OTP information (for example, eight digit numbers) into an OTP information entry field displayed on the screen of the user terminal 100 in a certain webpage, and presses a send key (see FIG. 6) so that the user terminal 100 requests a security authentication for a membership login of the certain online website by using the one time use authentication information (that is, a QR code) and the entered OTP information.

In this case, a security authentication requesting seed may be transmitted to a browser cookie, and at the same time, the entered OTP information may be transmitted to a Form (HTTP Post) value, and such a transmission may be performed through a HTTP/SSL security communication.

Thereafter, the security authentication server 300 performs a verification process on the security authentication. First, the security authentication server 300 extracts one time use authentication information from a user cookie requested by the user terminal 100; verifies a validity of issuance of the one time use authentication information by decrypting the authentication requesting seed (AES-256) to inquire about details of a validated issuance of the one time use authentication information by using a GUID as a key (for example, within 10 minutes based on the timestamp); and also verifies a validity of issuance of the OTP by comparing the extracted one time use authentication information with a record of OTP issuance.

Meanwhile, the security authentication method for a membership login of an online website according to the exemplary embodiment of the present invention may be implemented as a code in a recording medium that is readable by a computer. The computer readable recording medium may include all types of recording devices storing data readable by a computer system.

For example, the computer readable recording medium may include a read-only memory (ROM), a random-access memory (RAM), a CD-ROM, a magnetic tape, a hard disk, a floppy disk, a mobile storage device, a non-volatile memory, and an optical data storage device.

In addition, the computer readable recording medium may be distributed over a computer system connected through a computer communication network, so that the computer readable code is stored as a code and executed in a distributed fashion.

As is apparent from the above, the security authentication system for a membership login of an online website according to the present invention and the method thereof can ensure a safe membership login without having to directly entering a membership ID and a password for a membership login of a certain online website on a user terminal being used in association with a smartphone for a private or public purpose.

It will be apparent to those skilled in the art that various modifications can be made to the security authentication system for membership login of an online website according to the above-described exemplary embodiments of the present invention and the method thereof without departing from the spirit or scope of the invention. Thus, it is intended that the present invention covers all such modifications provided they come within the scope of the appended claims and their equivalents.

What is claimed is:

1. A method comprising:
   by a security authentication server, receiving a request for a temporary authentication information for an online website, generating the temporary authentication information for the online website prior to receiving actual authentication information for a login of the online website, and transmitting the generated temporary authentication information to a first client device;
   by a security authentication related application installed on a second client device, receiving the temporary authentication information, receiving the actual authentication information for the login of the online website, and requesting One Time Password (OTP) information from the security authentication server by using the temporary authentication information and the actual authentication information;
   by the security authentication server, verifying the temporary authentication information and the actual authentication information, generating OTP information based on the verification, and transmitting the generated OTP information to the second client device;
   by the first client device, transmitting, to the security authentication server, the OTP information transmitted by the security authentication server to the second client device as a result of the verification; and
   by the security authentication server, performing a verification process of the login of the online website from the first client device based on the OTP information transmitted by the first client device.

2. The method of claim 1, wherein:
   the temporary authentication information is a QR code; and
   the receiving the temporary authentication information includes scanning the QR code.

3. The method of claim 1, further comprising:
   generating an index of the temporary authentication information in a database; and
   generating a value of the temporary authentication information in an additional database.

4. The method of claim 1, wherein the temporary authentication information includes at least one of: a randomly generated identifier; an IP address of the first user device; or a time stamp corresponding to a time of issuance of the temporary authentication information.

5. The method of claim 1, wherein the requesting One Time Password (OTP) information from the security authentication server includes combining the temporary authentication information with the actual authentication information and generating a cryptogram of the combination.

6. The method of claim 1, wherein the generating the OTP information includes generating the OTP information based on at least one of an IP address of the second client device, the temporary authentication information, or an IP address of the first client device.

7. The method of claim 1, further comprising receiving, by the security authentication server, from the first client device, a request to login to the online website;
   and wherein the generating the temporary authentication information is performed in response to the request.

8. The method of claim 1, further comprising:
   by the security authentication server, generating a hash value for the temporary authentication information; and
   by the security authentication server, encrypting the temporary authentication information with the generated hash value.

9. The method of claim 1, further comprising:
   by the security authentication related application installed on the second client device, extracting data from the temporary authentication information, decrypting the extracted data, and verifying the extracted data via a hash-based message authentication code.

10. The method of claim 1, wherein the receiving actual authentication information for the login of the online website includes receiving token data that corresponds to a result of authentication of the membership login.

11. A system comprising:
    a first client device;
    a second client device; and
    a security authentication server configured to receive a request for a temporary authentication information for an online website, generate the temporary authentication information for the online website prior to receiving actual authentication information for a login of the online website, and transmit the generated temporary authentication information to the first client device, wherein:
    a security authentication related application installed on the second client device receives the temporary authentication information, receives the actual authentication information for the login of the online web site, and requests One Time Password (OTP) information from the security authentication server by using the temporary authentication information and the actual authentication information;
    the security authentication server verifies the temporary authentication information and the actual authentication information, generates OTP information based on the verification, and transmits the generated OTP information to the second client device;

the first client device transmits, to the security authentication server, the OTP information transmitted by the security authentication server to the second client device as a result of the verification; and the security authentication server performs a verification process of the login of the online website from the first client device based on the OTP information transmitted by the first client device.

12. The system of claim 11, wherein:

the temporary authentication information is a QR code; and the receiving the temporary authentication information includes scanning the QR code.

13. The system of claim 11, wherein the security authentication server is further configured to:

generating an index of the temporary authentication information in a database; and generating a value of the temporary authentication information in an additional database.

14. The system of claim 11, wherein the temporary authentication information includes at least one of: a randomly generated identifier; an IP address of the first user device; or a time stamp corresponding to a time of issuance of the temporary authentication information.

15. The system of claim 11, wherein the security authentication related application is further configured to combine the temporary authentication information with the actual authentication information and generate a cryptogram of the combination.

16. The system of claim 11, wherein the security authentication server is further configured to generate the OTP information based on at least one of an IP address of the second client device, the temporary authentication information, or an IP address of the first client device.

17. The system of claim 11, wherein the security authentication server is further configured to receive from the first client device, a request to login to the online website, and generate the temporary authentication information in response to the request.

18. The system of claim 11, wherein the security authentication server is further configured to: generate a hash value for the temporary authentication information; and encrypt the temporary authentication information with the generated hash value.

19. The system of claim 11, wherein the security authentication related application installed on the second client device is further configured to extract data from the temporary authentication information, decrypt the extracted data, and verify the extracted data via a hash-based message authentication code.

20. A method comprising:

receiving, from a first client device, a request to access an online website;

generating, at a security authentication server, temporary authentication information for the login of the online website in response to the request to access the online website and prior to receiving actual authentication information for the login of the online website;

transmitting the generated temporary authentication information to the first client device;

receiving, from a second client device, a request for a One Time Password (OTP) information, the request comprising the temporary authentication information and the actual authentication information for the login of the online website;

verifying the temporary authentication information and the actual authentication information;

generating OTP information based on the verification;

transmitting the generated OTP information to the second client device; and receiving and verifying the OTP information from the first client device.

* * * * *